US012601877B2

(12) United States Patent
Liu

(10) Patent No.: US 12,601,877 B2
(45) Date of Patent: Apr. 14, 2026

(54) MULTIPURPOSE FIBER-OPTIC CONNECTOR AND FIBER-OPTIC ADAPTER

(71) Applicant: ANYCOM TECHNOLOGY CO., LTD, Guangdong (CN)

(72) Inventor: Bingli Liu, Guangdong (CN)

(73) Assignee: ANYCOM TECHNOLOGY CO., LTD., Shenzhen (CN)

( * ) Notice: Subject to any disclaimer, the term of this patent is extended or adjusted under 35 U.S.C. 154(b) by 457 days.

(21) Appl. No.: 18/099,274

(22) Filed: Jan. 20, 2023

(65) Prior Publication Data

US 2023/0375789 A1 Nov. 23, 2023

Related U.S. Application Data

(63) Continuation of application No. PCT/CN2022/131624, filed on Nov. 14, 2022.

(30) Foreign Application Priority Data

May 17, 2022 (CN) .......................... 202221185767.2

(51) Int. Cl.
G02B 6/38 (2006.01)
(52) U.S. Cl.
CPC ....... G02B 6/3825 (2013.01); G02B 6/38875 (2021.05); G02B 6/3891 (2013.01);
(Continued)
(58) Field of Classification Search
CPC .. G02B 6/3807; G02B 6/3825; G02B 6/3826; G02B 6/3831; G02B 6/3849;
(Continued)

(56) References Cited

U.S. PATENT DOCUMENTS 6,062,739 A * 5/2000 Blake ................... G02B 6/3869
385/60
11,422,311 B2 * 8/2022 Verheyden ........... G02B 6/3825
(Continued)

FOREIGN PATENT DOCUMENTS

CN 101299085 A 11/2008
CN 105683795 A 6/2016
(Continued)

OTHER PUBLICATIONS

International Search Report for Corresponding PCT Application No. PCT/CN2022/131624.
(Continued)

*Primary Examiner* — Uyen Chau N Le

(57) ABSTRACT

Disclosed are a multipurpose fiber-optic connector and a fiber-optic adapter. The connector comprises: a tube, a detachable fastener and a connecting member. A cavity of the tube axially runs through a first end and a second end of the tube. The detachable fastener can slide back and forth between the first and second ends, but cannot reach the second end. The detachable fastener is provided with a first thread at one end and a snap-in portion at the other end, and the snap-in portion mates with a recess of the fiber-optic adapter to securely connect the fastener and the adapter. The connecting member can slide back and forth between the first and second ends, but cannot reach the first end, a second thread is provided on the connecting member, and the detachable fastener is fixedly sleeved on the tube. The convenience and safety of the connector can be both improved.

20 Claims, 4 Drawing Sheets

(52) U.S. Cl.
 CPC ......... *G02B 6/3893* (2013.01); *G02B 6/3894*
  (2013.01); *G02B 6/3849* (2013.01)
(58) Field of Classification Search
 CPC .. G02B 6/38875; G02B 6/389; G02B 6/3891;
  G02B 6/3893; G02B 6/3894
 See application file for complete search history.

(56) References Cited

U.S. PATENT DOCUMENTS

| | | | | | |
|---|---|---|---|---|---|
| 2016/0209599 | A1* | 7/2016 | Van Baelen | ....... | G02B 6/38875 |
| 2018/0364424 | A1* | 12/2018 | Ott | ........................... | G02B 6/44 |
| 2019/0101709 | A1* | 4/2019 | Wang | ................... | G02B 6/3877 |
| 2022/0128773 | A1* | 4/2022 | Lu | ........................ | G02B 6/3825 |
| 2024/0241323 | A1* | 7/2024 | Jutz | ........................ | H01R 13/59 |

FOREIGN PATENT DOCUMENTS

| | | | |
|---|---|---|---|
| CN | 108761657 | A | 11/2018 |
| CN | 110932031 | A | 3/2020 |
| CN | 210835344 | U | 6/2020 |
| CN | 112327424 | A | 2/2021 |
| CN | 212626276 | U | 2/2021 |
| CN | 212808705 | U | 3/2021 |
| CN | 214067438 | U | 8/2021 |
| CN | 216561095 | U | 5/2022 |

OTHER PUBLICATIONS

Written Opinion of the International Searching Authority for Corresponding PCT Application No. PCT/CN2022/131624.
Utility Model Patent Evaluation Report Dated Sep. 8, 2023 for Corresponding Chinese Patent Application No. 202221185767.2.
Notice of Acceptance of Invalidation Request Dated Oct. 25, 2024 for Corresponding Chinese Patent Application No. 202221185767.2.

* cited by examiner

MULTIPURPOSE FIBER-OPTIC CONNECTOR AND FIBER-OPTIC ADAPTER

CROSS-REFERENCE TO RELATED APPLICATIONS

The present application is a Continuation Application of PCT Application No. PCT/CN2022/131624, filed on Nov. 14, 2022, which claims the priority of Chinese Utility Model Application No. 202221185767.2, filed on May 17, 2022, the entire contents of which are hereby incorporated by reference.

TECHNICAL FIELD

The present application relates to the technical field of physical connections for fiber-optic communication, and more particularly to a multipurpose fiber-optic connector and fiber-optic adapter.

BACKGROUND

During fiber-optic connection, it is required to insert a fiber-optic cable into an optical fiber splice of a fiber-optic connector so as to achieve fiber-optic connection with a fiber-optic connection device by using the fiber-optic connector. At present, in the prior art, when a fiber-optic connector is assembled, a thread is provided at one end of a body of the fiber-optic connector, a connecting assembly of the fiber-optic connector is sleeved on the body from the end of the body provided with the thread, and a tail end of the fiber-optic connector is in fastened connection with the body by means of the thread at one end of the body. Since fiber-optic connection devices are different in model or made by different manufacturers, the connecting assemblies of the fiber-optic connectors need to be replaced so that the fiber-optic connectors are adaptable to and connectable with the fiber-optic connection devices. Generally, the connecting assembly in the fiber-optic connector is a double layered ferrule with an inner layer and an outer layer, that is to say, when the connecting assembly is replaced, multiple components need to be detached and replaced, making the operation cumbersome.

In a practical application scenario, for example, fiber to the home, a fiber splice tray is generally placed in a fiber distribution box, and a plurality of ports (indicated as "1", "2", "3" . . . "11", and "12" as shown in FIG. 1) may be provided in each fiber splice tray, each port corresponds to one fiber-optic connection device; and the fiber-optic connectors inserted into the ports of the fiber splice tray to achieve fiber-optic connection between the fiber-optic connectors and the fiber-optic connection devices, and accordingly fiber-optic access to multiple households is achieved by means of a small number of fiber splice trays. When the number of optical fibers is determined, the demand for the number of optical fibers for achieving fiber to the home can be met by increasing either the number of fiber splice trays or the size of the fiber splice trays. However, this results in a problem that it is inconvenient to carry due to the large size of the fiber splice tray. An alternative solution is increasing the number of fiber splice trays, that is to say, increasing the area or size of the fiber distribution boxes. However, especially for high-rise households, the requirements for the size of the fiber splice trays will be higher, and the space for the fiber distribution boxes are limited and thus the oversizing of the fiber splice trays will also bring some potential safety hazards.

Therefore, how to simultaneously improve the convenience and safety of a fiber-optic connector becomes a technical problem urgently need to be solved.

SUMMARY

The present application provides a multipurpose fiber-optic connector and a fiber-optic adapter, in order to simultaneously improve the convenience and safety of fiber-optic connectors.

In a first aspect, the present application provides a multipurpose fiber-optic connector, including a tube, a detachable fastener, and a connecting member, wherein a cavity of the tube runs through a first end and a second end of the tube in an axial direction, and the cavity is used for a fiber-optic cable to pass through;

the detachable fastener is a single-piece component, the detachable fastener can be sleeved on the tube from the first end, is capable of sliding back and forth between the first end and the second end of the tube, but is incapable of reaching the second end; the detachable fastener is provided with a first thread at one end and a snap-in portion at the other end, and when the other end of the detachable fastener is inserted into the fiber-optic adapter, the snap-in portion snaps in a recess of the fiber-optic adapter to connect the detachable fastener and the fiber-optic adapter; and the connecting member is a single-piece component, and the connecting member can be sleeved on the tube from the second end of the tube, is capable of sliding back and forth between the first end and the second end of the tube, but is incapable of reaching the first end; a second thread is provided on the connecting member, the detachable fastener is fixedly sleeved on the tube after the second thread is engaged with the first thread; wherein there is a first preset distance between the connecting member and the first end, and there is a second preset distance between the detachable fastener and the second end, such that the detachable fastener is incapable of reaching the second end, and the connecting member is incapable of reaching the first end; wherein the detachable fastener is detachably connected to the connecting member by means of the first thread such that the detachable fastener is replaceable with another fastener adapted to another fiber-optic adapter, so as to be adapted to the another fiber-optic adapter.

In a second aspect, the present application further provides a fiber-optic adapter adapted to the multipurpose fiber-optic connector described in any one of the first aspects, the fiber-optic adapter including: a recess formed in a cavity of the fiber-optic adapter to securely connect the multipurpose fiber-optic connector and the fiber-optic adapter by means of engagement with the snap-in portion of the detachable fastener.

The present application discloses a multipurpose fiber-optic connector and a fiber-optic adapter. The multipurpose fiber-optic connector includes the tube, the detachable fastener and the connecting member, wherein both the detachable fastener and the connecting member are the single-piece components, and the detachable fastener is detachably connected to the connecting member by means of the first thread, so that when it is required to replace the detachable fastener of the multipurpose fiber-optic connector, only one component needs to be detached and replaced, simplifying dismounting and replacement operations and improving convenience; in addition, the detachable fastener can be replaced with other fasteners to be adapted to other fiber-optic adapters, achieving multiple purposes of the multipurpose fiber-optic connector; furthermore, the arrangement of the single components can also allow the cross-sectional area of the multipurpose fiber-optic connector to be decreased, so that when the number of multipurpose fiber-optic connectors to which a single fiber splice tray can be connected is constant, the fiber splice tray can be decreased in size and is convenient to carry, the space occupied by the fiber splice tray in a fiber distribution box can further be reduced, and the safety is thus improved.

Moreover, different arrangements are respectively made on two ends of the detachable fastener, so that this single component can simultaneously achieve the respective fastened connections between the two ends and other components, that is to say, the detachable fastener can be in fastened connection with the connecting member by means of the end provided with the first thread, and can be in fastened connection with the fiber-optic adapter by means of the end provided with the snap-in portion, so that no additional connection assembly is needed during the fastened connection, saving the space, and further reducing the size of the multipurpose fiber-optic connector.

BRIEF DESCRIPTION OF THE DRAWINGS

In order to more clearly illustrate the technical solutions of the embodiments of the present application, the drawings required for describing the embodiments will be briefly described below. Apparently, the drawings in the following description show some of the embodiments of the present application, and persons of ordinary skill in the art may also still derive other drawings from these drawings without creative efforts.

DETAILED DESCRIPTION OF THE EMBODIMENTS

The present application will be described below based on embodiments, but the present application is not merely limited to these embodiments. In the following detailed description of the present application, some specific details are depicted in order to avoid obscuring the essence of the present application. Common general methods, processes, and components are not set forth in detail.

In addition, those of ordinary skill in the art will appreciate that the drawings provided herein are for illustrative purposes and are not necessarily drawn to scale.

Unless the context clearly indicates otherwise, the words such as "comprise(s)", "include(s)", etc. throughout the descriptions and the claims shall be construed as having an inclusive meaning rather than an exclusive or exhaustive meaning, that is to say, a meaning of "including, but not limited to".

In the descriptions of the present application, it is to be understood that the terms "first", "second", etc. are merely for descriptive purposes and shall not be construed as indicating or implying relative importance. Moreover, in the descriptions of the present application, the meaning of "a plurality of" is two or more, unless otherwise specified.

Figure 1:
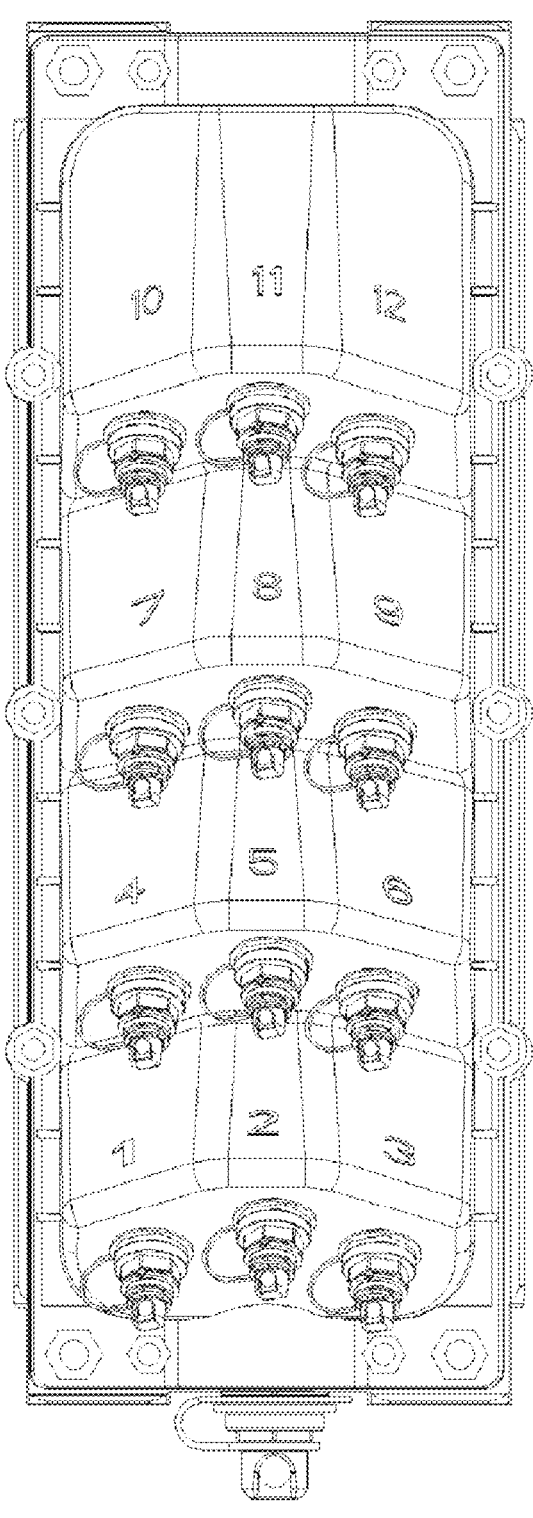
FIG. 1 is a schematic structural view of a fiber splice tray in the prior art.
Figure 2:
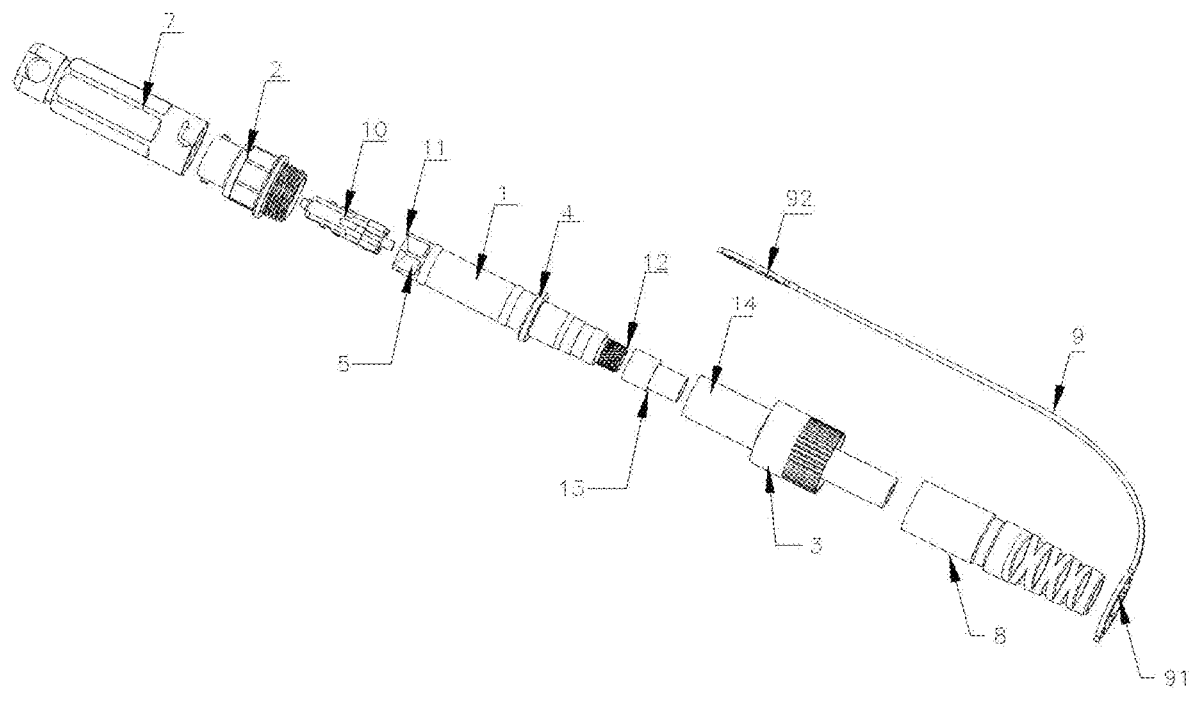
FIG. 2 is a schematic view showing an exploded structure of a multipurpose fiber-optic connector according to an embodiment of the present application.

Referring to FIG. 2, FIG. 2 is a schematic view showing an exploded structure of a multipurpose fiber-optic connector according to an embodiment of the present application. The multipurpose fiber-optic connector includes a tube 1, a detachable fastener 2 and a connecting member 3; wherein a cavity of the tube 1 runs through a first end 11 and a second end 12 of the tube 1 in an axial direction, and the cavity is used for a fiber-optic cable to pass through.

As shown in FIG. 2, the multipurpose fiber-optic connector further includes an optical fiber splice 10. The optical fiber splice 10 is connected to the first end 11 of the tube 1. A fiber-optic cable passes through the cavity of the tube 1 from the second end 12 of the tube 1 and through the first end 11 of the tube 1 to be connected with the optical fiber splice 10.

The detachable fastener 2 is a single-piece component, and when it is required to replace the detachable fastener 2 of the multipurpose fiber-optic connector, only one single component needs to be detached and replaced compared to a connecting assembly of a double-layer structure, that is to say, only the detachable fastener 2 is detached and replaced, so as to simplify removal and replacement operations; also, compared to the connecting assembly of a double-layer structure, the cross-sectional area of the single-piece fastener 2 can also be decreased, and the cross-sectional area of the multipurpose fiber-optic connector can then be decreased, that is to say, when the size of a fiber splice tray is constant, more multipurpose fiber-optic connectors can be connected to one fiber splice tray, so that the number requirement for achieving fiber to the home can be met by using a smaller number of fiber splice trays; while the number of the multipurpose fiber-optic connectors to which a single fiber splice tray can be connected is constant, the fiber splice tray can be small in size, the space occupied by the fiber splice tray in a fiber distribution box can thus be reduced, and the safety in use can be improved.

To make this effect clear to those skilled in the art, specifically, as the cross-sectional area of the fiber-optic connector is decreased, the cross-sectional area of a fiber-optic adapter to which the fiber-optic connector is fitted is also decreased. Due to the size decrease of the fiber-optic adapter, when the size of the fiber splice tray is constant, more fiber-optic adapters can be fixed in one fiber splice tray, and the number requirement for achieving fiber to the home can thus be met by using a smaller number of fiber splice trays; however, when the number of the fiber-optic adapters fixed inside the fiber splice tray is constant, the size decrease of the fiber-optic adapter allows the fiber splice tray to be also small in size, the space occupied by the fiber splice tray in the fiber distribution box is thus be reduced, and the safety is improved in use.

During the specific implementation, part of the exterior of the detachable fastener 2 may be shaped as a multi-protrusion structure composed of a plurality of cross sections, such as a hexagonal or octagonal structure, and it is also possible to provide ribs or the like on the exterior of the detachable fastener 2. By providing such part of the external structure of the detachable fastener 2, the friction between the detachable fastener 2 and the user's hand can be increased when the detachable fastener 2 is mounted, so as to facilitate mounting and improve the convenience of mounting.

The detachable fastener 2 can be sleeved on the tube 1 from the first end 11, and is capable of sliding back and forth between the first end 11 and the second end 12 of the tube 1, but is incapable of reaching the second end 12. The detachable fastener 2 is mounted in the direction from the first end 11 to the second end 12 of the tube 1; after the detachable fastener 2 is sleeved on the tube 1, it is capable of sliding back and forth between the first end 11 and the second end 12 of the tube 1, but is incapable of reaching the second end 12 when sliding, that is to say, there is always a certain distance between the detachable fastener 2 and an end face of the second end 12 when sliding.

Figure 3:
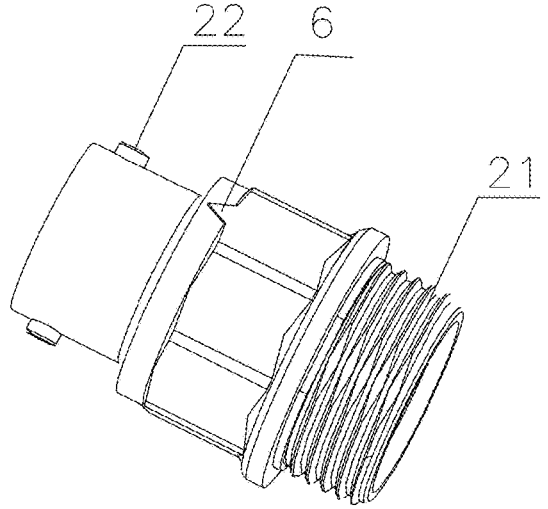
FIG. 3 is a schematic structural view of a detachable fastener of a multipurpose fiber-optic connector according to an embodiment of the present disclosure.

As shown in FIG. 3, one end of the detachable fastener 2 is provided with a first thread 21, and the other end of the detachable fastener 2 is provided with a snap-in portion 22; when the other end of the detachable fastener 2 is inserted into the fiber-optic adapter, the snap-in portion 22 snaps into a recess of the fiber-optic adapter to connect the detachable fastener 2 and the fiber-optic adapter. The snap-in portion 22 may be a snap-fit fastener, a hook or other parts that can be used for snap-in connection. When the end of the detachable fastener 2 provided with the snap-in portion 22 is inserted into the fiber-optic adapter, the recess of the fiber-optic adapter is engaged with the snap-in portion 22, thereby achieving a snap-in connection between the fiber-optic adapter and the detachable fastener 2. During the specific implementation, when the snap-in portion 22 is engaged with the recess, the fastened connection between the fiber-optic adapter and the detachable fastener 2 may be achieved by rotating the detachable fastener 2 or rotating the fiber-optic adapter. In order to be adapted to another fiber-optic adapter, the detachable fastener 2 is detachably connected to a connecting member 3 by means of the first thread 21 so that the detachable fastener can be replaced with another fastener adapted to another fiber-optic adapter. Since fiber-optic connection devices are different in model or made by different manufacturers, resulting in great difference in models or structures of fiber-optic adapters, in order to adapt to various types of fiber-optic adapters and achieve multiple purposes of the multipurpose fiber-optic connector, it is possible to disassemble the detachable fastener 2 and the connecting member 3 by means of the first thread 21 so as to replace the detachable fastener 2 with other fasteners, and the mounted other fasteners are connected to the connecting member 3 so as to adapt to other fiber-optic adapters.

The connecting member 3 is a single-piece component. The connecting member 3 can be sleeved on the tube 1 from the second end 12 of the tube 1, and is capable of sliding back and forth between the first end 11 and the second end 12 of the tube 1, but is incapable of reaching the first end 11. The connecting member 3 is mounted in the direction from the second end 12 to the first end 11 of the tube 1; after the connecting member 3 is sleeved on the tube 1, it is capable of sliding back and forth between the first end 11 and the second end 12 of the tube 1, but is incapable of reaching the first end 11 when sliding, that is to say, there is always a certain distance between the connecting member 3 and the end face of the first end 11 when sliding.

A second thread is provided on the connecting member 3, the second thread is engaged with the first thread 21, and the detachable fastener 2 is fixedly sleeved on the tube 1 after the second thread is engaged with the first thread 21, wherein there is a first preset distance between the connecting member 3 and the first end 11, and there is a second preset distance between the detachable fastener 2 and the second end 12, so that the detachable fastener 2 is incapable of reaching the second end 12, and the connecting member 3 is incapable of reaching the first end 11.

The detachable fastener 2 is a single-piece component, the detachable fastener 2 is provided with the first thread 21 at one end and the snap-in portion 22 at the other end, and the two ends of the single component are respectively provided with different structures, so that the single-piece component can simultaneously achieve the respective fastened connections between the two ends and other components, that is to say, the detachable fastener 2 can be in fastened connection with the connecting member 3 by means of the end provided with the first thread 21, and can be in fastened connection with the fiber-optic adapter by means of the end provided with the snap-in portion 22, so that no additional connection assembly is thus needed during the fastened connection, saving the space, and further decreasing the size of the multipurpose fiber-optic connector.

In an embodiment, the first thread 21 is an external thread, and the second thread is an internal thread. In another embodiment, the first thread 21 is an internal thread, and the second thread is an external thread. Preferably, the first thread 21 is an external thread, and the second thread is an internal thread. Compared with the manner that the first thread 21 is an internal thread and the second thread is an external thread, such arrangement makes it possible to release the fastened connection between the detachable fastener 2 and the connecting member 3 by rotating the connecting member 3 when the detachable fastener 2 is detached, so that the contact with an optical fiber splice 10 during detachment can be reduced, the probability of damaging the optical fiber splice 10 can thus be reduced, and the connection accuracy of the optical fiber splice 10 in the multipurpose fiber-optic connector can be improved.

Referring to FIG. 2, the multipurpose fiber-optic connector further comprises an annular stopper 4. The annular stopper 4 is provided on the outer side of the tube 1 and is integrally formed with the tube 1. The integrated structure of the annular stopper 4 and the tube 1 can facilitate the production and machining with one mold, and can also avoid a connection error caused by the assembly of the annular stopper 4 and the tube 1 when they are separate components, thereby improving the connection accuracy, and the integrated structure can facilitate the control of the sizes of the annular stopper 4 and the tube 1, so that the annular stopper 4 and the tube 1 can be small in size, and the size of the multipurpose fiber-optic connector can thus be decreased.

The annular stopper 4 abuts against one end of the detachable fastener 2 such that the detachable fastener 2 is incapable of reaching the second end 12, and the snap-in portion 22 of the detachable fastener 2 is positioned such that the snap-in portion 22 is accurately connected to the fiber-optic adapter. After the detachable fastener 2 is sleeved on the tube 1, the end face of the end of the detachable fastener 2 provided with the first thread 21 abuts against the annular stopper 4, and the annular stopper 4 limits the position of the detachable fastener 2 on the tube 1 such that the detachable fastener 2 is incapable of reaching the second end 12 of the tube 1. Meanwhile, the annular stopper 4 also position the snap-in portion 22 of the detachable fastener 2 while limiting the position of the detachable fastener 2 on the tube 1, so that the snap-in portion 22 can be accurately connected to the fiber-optic adapter during connection. The cause is that the requirement for the connection accuracy of the fiber-optic connector and the fiber-optic adapter is high, and the connection accuracy and connection stability between the fiber-optic adapter and the fiber-optic connector can be ensured by accurately fitting the snap-in portion 22 in the recess of the fiber-optic adapter.

The annular stopper 4 abuts against the connecting member 3 such that the connecting member 3 is incapable of reaching the first end 11. During the specific implementation, after the connecting member 3 is in fastened connection with the detachable fastener 2, the connecting member 3 abuts against the annular limiting piece 4, such that the connecting member 3 is incapable of sliding towards the first end 11 of the tube 1; the detachable fastener 2 abuts against the annular stopper 4 such that the detachable fastener 2 is incapable of sliding towards the second end 12 of the tube 1, the connecting member 3 and the detachable fastener 2 are thus fixed to the tube 1, and the connecting member 3 and the detachable fastener 2 are prevented from sliding on the tube 1.

Referring to FIG. 2, the multipurpose fiber-optic connector further includes a fool-proofing assembly 5. The fool-proofing assembly 5 is provided at the first end 11 of the tube 1 and integrally formed with the tube 1. By integrally forming the fool-proofing assembly 5 with the tube 1, the production and machining of the fool-proofing assembly 5 and the tube 1 can be facilitated with one mold, a connection error caused by the assembly of the annular stopper 5 and the tube 1 can also be avoided when they are separate components, and the connection accuracy can thus be improved; in addition, the integrally formed structure can facilitate the control of the sizes of the fool-proofing assembly 5 and the tube 1, so that the fool-proofing assembly 5 and the tube 1 can be small in size, and the size of the multipurpose fiber-optic connector can thus be decreased.

Figure 4:
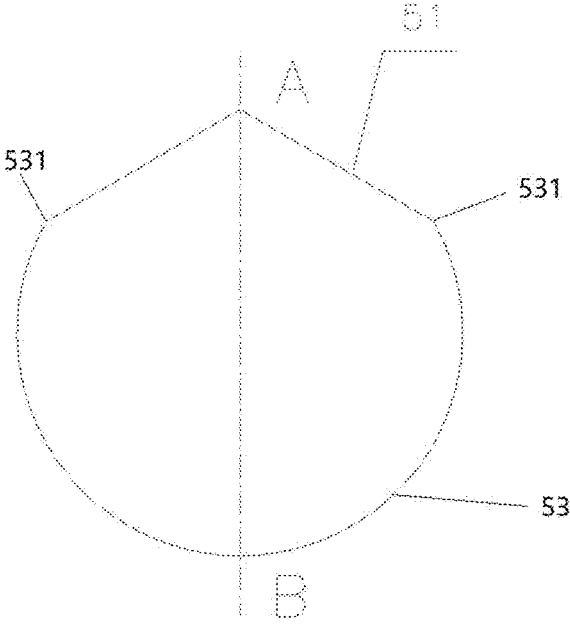
FIG. 4 is a schematic view of a fool-proofing assembly of a multipurpose fiber-optic connector according to an embodiment of the present disclosure.

Referring to FIG. 4, FIG. 4 is a schematic structural view of the fool-proofing assembly. As shown in FIG. 4, the fool-proofing assembly 5 includes exactly one fool-proofing protrusion 51, wherein the fool-proofing protrusion 51 includes a protrusion body formed by two adjacent sides of a regular hexagon inscribed in a circle centered on the end face of the first end 11 of the tube 1. That is to say, the end face of the first end 11 of the tube 1 is taken as the center of the circle, the inscribed regular hexagon is made in the obtained circle, and the protrusion formed by the two adjacent sides of the obtained inscribed regular hexagon is taken as the fool-proofing protrusion. Furthermore, the fool-proofing assembly 5 is the same as the end face of the first end 11 of the tube 1 in size. The fool-proofing assembly has a circumferential surface 53, two opposite ends 531 of the circumferential surface 53 are respectively connected to the two adjacent sides. The dotted line in FIG. 4 is the axis of the fool-proofing assembly, point A serves as the vertex of the fool-proofing protrusion, the line between A and B represents the diameter of a circumscribed circle of the regular hexagon in which the fool-proofing protrusion is located, and the fool-proofing assembly 5 being the same as the end face of the first end 11 of the tube 1 in size means that the length from A to B is the same as the diameter of the end face of the first end 11 of the tube 1. The same size may refer to that the length from A to B is exactly the same as the diameter of the end face of the first end 11 of the tube 1, or that there is an error between the length from A to B and the diameter of the end face of the first end 11 of the tube 1, which is within an acceptable range.

Referring to FIG. 3, the multipurpose fiber-optic connector further includes a first reference member 6, wherein the first reference member 6 is provided on the detachable fastener 2 and is integrally formed with the detachable fastener 2. By integrally forming the first reference member 6 with the detachable fastener 2, the production and machining of the first reference member 6 and the detachable fastener 2 can be facilitated with one mold, a connection error caused by the assembly of the first reference member 6 and the detachable fastener 2 can also be avoided when they are separate components, and the connection accuracy can thus be improved; in addition, the integrally formed structure can facilitate the control of the sizes of the first reference member 6 and detachable fastener 2, so that the first reference member 6 and the detachable fastener 2 can be small in size, and the size of the multipurpose fiber-optic connector can thus be decreased.

Figure 5:
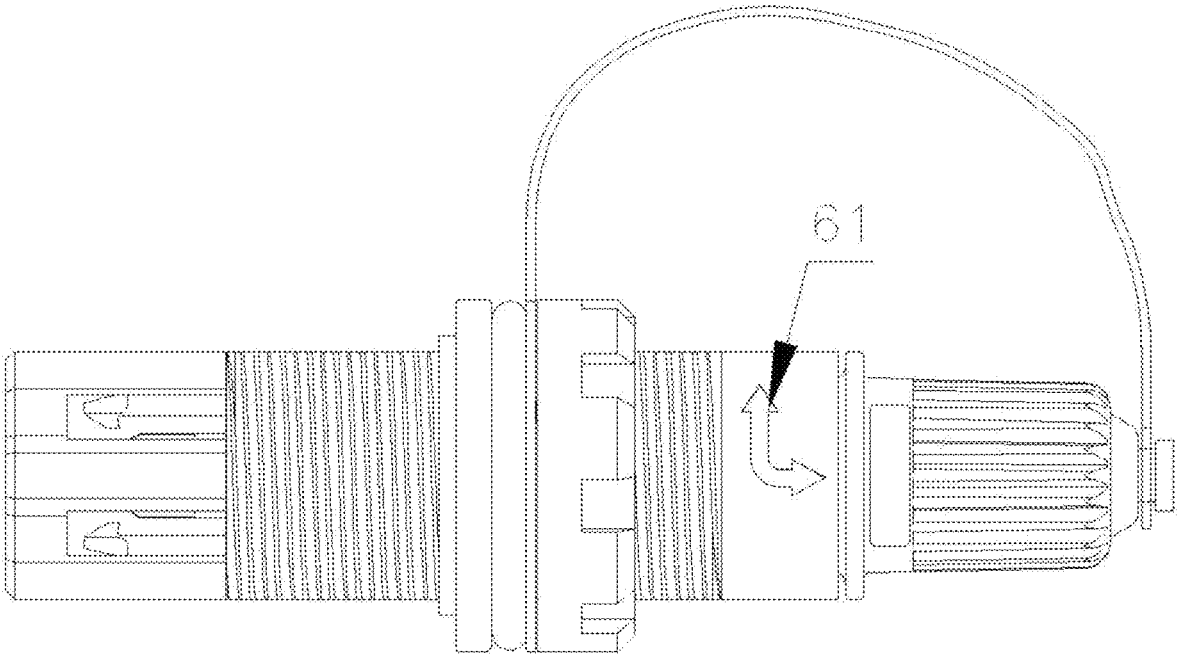
FIG. 5 is a schematic structural view of a fiber-optic adapter according to an embodiment of the present disclosure.

The first reference member 6 is capable of guiding the snap-in portion 22 to be aligned to the recess of the fiber-optic adapter such that the snap-in portion 22 is capable of fitting with the recess of the fiber-optic adapter to securely connect the detachable fastener 2 and the fiber-optic adapter. As shown in FIG. 5, it is a schematic view of the fiber-optic adapter adapted to the multipurpose fiber-optic connector. The first reference member 6 is used for indicating the connection direction of the detachable fastener 2, the fiber-optic adapter is provided with a reference portion 61, and when the detachable fastener 2 is connected to the fiber-optic adapter, the detachable fastener 2 is directly inserted into the fiber-optic adapter and rotated according to the indicated direction of the reference portion 61 after the first reference member 6 is aligned to the reference portion 61 provided on the fiber-optic adapter, such that the snap-in portion 22 can mate with the recess of the fiber-optic adapter to securely connect the detachable fastener 2 and the fiber-optic adapter. The reference portion 61 on the fiber-optic adapter may be in an arrow shape.

Referring to FIG. 2, the multipurpose fiber-optic connector further includes a cap 7, wherein the cap 7 is sleeved on the detachable fastener 2. When the multipurpose fiber-optic connector is not connected to the fiber-optic adapter, the cap 7 can be sleeved on the detachable fastener 2, and makes the detachable connecting member 2 and the optical fiber splice 10 dust-proof and water-proof and thus achieve protection for the same; when the multipurpose fiber-optic connector is connected to the fiber-optic adapter, the cap 7 is detached from the detachable fastener 2 such that the detachable fastener 2 is adapted to the fiber-optic adapter so as to achieve the fastened connection with the fiber-optic adapter.

Figure 6:
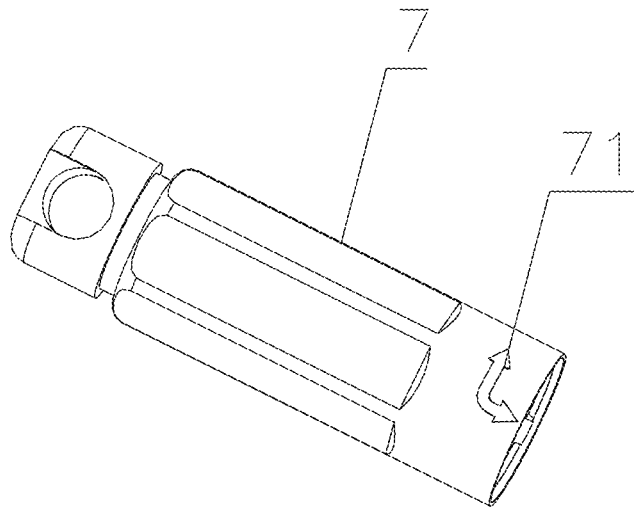
FIG. 6 is a schematic structural view of a cap of a multipurpose fiber-optic connector according to an embodiment of the present application.

As shown in FIG. 6, a second reference member 71 is provided on the side of the cap 7 adjacent to the tube 1, and the second reference member 71 cooperates with the first reference member 6 such that when the first reference member 6 is aligned to the second reference member 71, and the snap-in portion 22 can fit a mating portion of the cap 7 to securely connect the detachable fastener 2 and the cap 7. The mating portion of the cap 7 may be a recess. During the specific implementation, the second reference member 71 on the cap 7 may be arrow-shaped to indicate the connection direction of the cap 7 and the detachable fastener 2, and the detachable fastener 2 may be rotated according to the direction indicated by the second reference member 71 so as to achieve secure connection between the detachable fastener 2 and the cap 7.

As shown in FIG. 2, the multipurpose fiber-optic connector further includes a crimp eyelet 13 and a ferrule 14, wherein the crimp eyelet 13 is sleeved on the second end 12 of the tube 1, and the crimp eyelet 13 is of an annular structure, with a hollow portion for a fiber-optic cable to pass through. The connecting member 3 is sleeved on the ferrule 14, one end of the ferrule 14 is sleeved on the second end 12 of the tube 1, and the ferrule 14 is also of a hollow structure, with hollow portion for the fiber-optic cable to pass through. The ferrule 14 is coaxial with the crimp eyelet 13. The ferrule 14 may be a heat-shrinkable sleeve.

When the end of the ferrule 14 is sleeved on the second end 12 of the tube 1, the crimp eyelet 13 abuts against the tube 1 in a sleeved manner to fix the crimp eyelet 13, and the connecting member 3 is capable of sliding on the tube 1 but is incapable of reaching the first end 11 of the tube 1.

Referring to FIG. 2, the multipurpose fiber-optic connector further includes a boot 8. The boot 8 is detachably connected to the second end 12 of the tube 1, and the boot 8 is of a hollow structure for the fiber-optic cable to pass through. During the particular implementation, the boot 8 may be sleeved on the ferrule 14 to achieve detachable connection between the boot 8 and the second end 12 of the tube 1.

Referring to FIG. 2, the multipurpose fiber-optic connector further includes a connecting tie 9, wherein one end of the connecting tie 9 is provided with a first ring 91, the other end of the connecting tie 9 is provided with a second ring 92, one end of the connecting tie 9 is sleeved on the boot 8 by means of the first ring 91, and the other end is sleeved on the cap 7 by means of the second ring 92 so as to connect the boot 8 and the cap 7. The cap 7 can be connected to the boot 8 by connecting the first ring 91 and the second ring 92 at the two ends of the connecting tie 9, and after the multipurpose fiber-optic connector is assembled, the cap 7 can be connected to the multipurpose fiber-optic connector by means of the connecting tie 9, so as to prevent the cap 7 from being lost. The connecting tie 9 may be a nylon tie or a tie made of another material, such as plastic, which has good durability.

As shown in FIG. 5, the present application also provides a fiber-optic adapter. The fiber-optic adapter is adapted to the multipurpose fiber-optic connector described above, wherein the fiber-optic adapter includes a recess formed in a cavity of the fiber-optic adapter (not shown) to securely connect the multipurpose fiber-optic connector and the fiber-optic adapter by means of mating with the snap-in portion 22 of the detachable fastener 2.

The present application discloses a multipurpose fiber-optic connector and a fiber-optic adapter. The multipurpose fiber-optic connector includes the tube, the detachable fastener and the connecting member, wherein both the detachable fastener and the connecting member are the single-piece components, and the detachable fastener is detachably connected to the connecting member by means of the first thread, so that when it is required to replace the detachable fastener of the multipurpose fiber-optic connector, only one single component needs to be detached and replaced, simplifying disassembling and replacement operations and improving convenience; in addition, the detachable fastener can be replaced with other fasteners to be adapted to other fiber-optic adapters, achieving multiple purposes of the multipurpose fiber-optic connector; furthermore, the arrangement of the single components can also allow the cross-sectional area of the multipurpose fiber-optic connector to be decreased, so that when it is constant in the number of multipurpose fiber-optic connectors to which a single fiber splice tray can be connected, the fiber splice tray can be decreased in size and is convenient to carry, the space occupied by the fiber splice tray in a fiber distribution box can further be reduced, and the safety is thus improved.

Moreover, different arrangements are respectively made on two ends of the detachable fastener, so that this single-piece component can simultaneously achieve the respective fastened connections between the two ends and other components, that is to say, the detachable fastener can be in fastened connection with the connecting member by means of the end provided with the first thread, and can be in fastened connection with the fiber-optic adapter by means of the end provided with the snap-in portion, so that no additional connection assembly is needed during the fastened connection, saving the space, and further reducing the size of the multipurpose fiber-optic connector.

The above descriptions are merely the specific embodiments of the present application, but the scope of protection of the present application is not limited thereto, those skilled in the art would readily think of various equivalent modifications or substitutions within the technical scope disclosed in the present application, and these modifications or substitutions should all be intended to be included within the scope of protection of the present application. Therefore, the scope of protection of the present application shall be subject to the scope of protection of the claims.

The invention claimed is:

1. A multipurpose fiber-optic connector, comprising: a tube, a detachable fastener and a connecting member, wherein a cavity of the tube runs through a first end and a second end of the tube in an axial direction, the cavity being used for a fiber-optic cable to pass through;

the detachable fastener is a one-piece component formed as a single layer, the detachable fastener is capable of being sleeved on the tube from the first end, and is slidable back and forth between the first end and the second end of the tube, but is incapable of reaching the second end; one end of the detachable fastener is provided with a first thread, an other end of the detachable fastener is provided with a snap-in portion, both of the first thread and the snap-in portion are formed as undetachable portions of the single layer, and when the other end of the detachable fastener is inserted into a fiber-optic adapter, the snap-in portion is snapped in a recess of the fiber-optic adapter to connect the detachable fastener and the fiber-optic adapter; and the connecting member is a one piece component, the connecting member is sleeved on the tube from the second end of the tube, and is slidable back and forth between the first end and the second end of the tube, but is incapable of reaching the first end; after the connecting member is sleeved on the tube and positioned in place ready to be engaged with the detachable fastener, the connecting member is slidable relative to the tube; a second thread is provided on the connecting member and engaged with the first thread, and the detachable fastener is fixedly sleeved on the tube after the second thread is engaged with the first thread; wherein a first preset distance is defined between the connecting member and the first end, and a second preset distance is defined between the detachable fastener and the second end, such that the detachable fastener is incapable of reaching the second end, and the connecting member is incapable of reaching the first end; wherein the detachable fastener is detachably connected to the connecting member by means of the first thread such that the detachable fastener is replaceable with another fastener adapted to another fiber-optic adapter so as to be adapted to the another fiber-optic adapter.

2. The multipurpose fiber-optic connector of claim 1, further comprising:

an annular stopper provided on the outer side of the tube and integrally formed with the tube;

the annular stopper abuts against one end of the detachable fastener such that the detachable fastener is incapable of reaching the second end, and the snap-in portion of the detachable fastener is positioned such that the snap-in portion is accurately connected to the fiber-optic adapter; and the annular stopper abuts against the connecting member such that the connecting member is incapable of reaching the first end.

3. A fiber-optic adapter adapted to the multipurpose fiber-optic connector of claim 2, the fiber-optic adapter comprising:

a recess formed in a cavity of the fiber-optic adapter to securely connect the multipurpose fiber-optic connector and the fiber-optic adapter by means of engagement with the snap-in portion of the detachable fastener.

4. The system of claim 3, wherein the distal limit portion is non-closed in a circumferential direction.

5. The multipurpose fiber-optic connector of claim 1, wherein the first thread is an external thread, and the second thread is an internal thread.

6. A fiber-optic adapter adapted to the multipurpose fiber-optic connector of claim 5, the fiber-optic adapter comprising:

a recess formed in a cavity of the fiber-optic adapter to securely connect the multipurpose fiber-optic connector and the fiber-optic adapter by means of engagement with the snap-in portion of the detachable fastener.

7. The multipurpose fiber-optic connector of claim 1, wherein the first thread is an internal thread, and the second thread is an external thread.

8. A fiber-optic adapter adapted to the multipurpose fiber-optic connector of claim 7, the fiber-optic adapter comprising:

a recess formed in a cavity of the fiber-optic adapter to securely connect the multipurpose fiber-optic connector and the fiber-optic adapter by means of engagement with the snap-in portion of the detachable fastener.

9. The multipurpose fiber-optic connector of claim 1, further comprising:

a fool-proofing assembly provided at the first end of the tube and integrally formed with the tube, the fool-proofing assembly comprising exactly one fool-proofing protrusion, the fool-proofing protrusion comprising a protrusion body formed by two adjacent sides of a regular hexagon inscribed in a circle centered on an end face of the first end of the tube, the fool-proofing assembly having a size being the same as the end face of the first end of the tube; the fool-proofing assembly has a circumferential surface, two opposite ends of the circumferential surface are respectively connected to the two adjacent sides.

10. The multipurpose fiber-optic connector of claim 1, further comprising:

a first reference member provided on the detachable fastener and integrally formed with the detachable fastener to guide the snap-in portion to be aligned to the recess of the fiber-optic adapter, so as to securely connect the detachable fastener and the fiber-optic adapter.

11. The multipurpose fiber-optic connector of claim 10, further comprising:

a cap sleeved on the detachable fastener, a second reference member being provided on one side of the cap adjacent to the tube, and the second reference member cooperating with the first reference member such that when the first reference member is aligned to the second reference member, the snap-in portion is fittable with a mating portion of the cap to securely connect the detachable fastener and the cap.

12. The multipurpose fiber-optic connector of claim 11, further comprising:

a boot detachably connected to the second end of the tube, and the boot being of a hollow structure for the fiber-optic cable to pass through.

13. The multipurpose fiber-optic connector of claim 12, further comprising:

a connecting tie with one end thereof provided with a first ring, and an other end thereof provided with a second ring, the one end of the connecting tie being sleeved on the boot by means of the first ring, and the other end of the connecting tie being sleeved on the cap by means of the second ring so as to connect the boot and the cap.

14. A fiber-optic adapter adapted to the multipurpose fiber-optic connector of claim 13, the fiber-optic adapter comprising:

a recess formed in a cavity of the fiber-optic adapter to securely connect the multipurpose fiber-optic connector and the fiber-optic adapter by means of engagement with the snap-in portion of the detachable fastener.

15. A fiber-optic adapter adapted to the multipurpose fiber-optic connector of claim 10, the fiber-optic adapter comprising:

a recess formed in a cavity of the fiber-optic adapter to securely connect the multipurpose fiber-optic connector and the fiber-optic adapter by means of engagement with the snap-in portion of the detachable fastener.

16. A fiber-optic adapter adapted to the multipurpose fiber-optic connector of claim 11, the fiber-optic adapter comprising:

a recess formed in a cavity of the fiber-optic adapter to securely connect the multipurpose fiber-optic connector and the fiber-optic adapter by means of engagement with the snap-in portion of the detachable fastener.

17. A fiber-optic adapter adapted to the multipurpose fiber-optic connector of claim 12, the fiber-optic adapter comprising:

a recess formed in a cavity of the fiber-optic adapter to securely connect the multipurpose fiber-optic connector and the fiber-optic adapter by means of engagement with the snap-in portion of the detachable fastener.

18. A fiber-optic adapter adapted to the multipurpose fiber-optic connector of claim 1, the fiber-optic adapter comprising:

a recess formed in a cavity of the fiber-optic adapter to securely connect the multipurpose fiber-optic connector and the fiber-optic adapter by means of engagement with the snap-in portion of the detachable fastener.

19. The multipurpose fiber-optic connector of claim 1, further comprising:

a crimp eyelet and a ferrule, the crimp eyelet being sleeved on the second end of the tube, and the crimp eyelet being of an annular structure, with a hollow portion for a fiber-optic cable to pass through, the connecting member being sleeved on the ferrule, one end of the ferrule being sleeved on the second end of the tube, and the ferrule being also of a hollow structure, with hollow portion for the fiber-optic cable to pass through, wherein when the end of the ferrule is sleeved on the second end of the tube, the crimp eyelet abuts against the tube in a sleeved manner to fix the crimp eyelet.

20. A multipurpose fiber-optic connector, comprising: a tube, a detachable fastener, a connecting member and a boot, wherein a cavity of the tube runs through a first end and a second end of the tube in an axial direction, the cavity being used for a fiber-optic cable to pass through;

the detachable fastener is a one-piece component formed as a single layer, the detachable fastener is capable of being sleeved on the tube from the first end, and is slidable back and forth between the first end and the second end of the tube, but is incapable of reaching the second end; one end of the detachable fastener is provided with a first thread, an other end of the detachable fastener is provided with a snap-in portion, both of the first thread and the snap-in portion are formed as undetachable portions of the single layer, and when the other end of the detachable fastener is inserted into a fiber-optic adapter, the snap-in portion is snapped in a recess of the fiber-optic adapter to connect the detachable fastener and the fiber-optic adapter;

the connecting member is a one piece component, the connecting member is sleeved on the tube from the second end of the tube, and is slidable back and forth between the first end and the second end of the tube, but is incapable of reaching the first end; a second thread is provided on the connecting member and engaged with the first thread, and the detachable fastener is fixedly sleeved on the tube after the second thread is engaged with the first thread; wherein a first preset distance is defined between the connecting member and the first end, and a second preset distance is defined between the detachable fastener and the second end, such that the detachable fastener is incapable of reaching the second end, and the connecting member is incapable of reaching the first end; wherein the detachable fastener is detachably connected to the connecting member by means of the first thread such that the detachable fastener is replaceable with another fastener adapted to another fiber-optic adapter so as to be adapted to the another fiber-optic adapter;

the boot is detachably connected to the second end of the tube, and the boot is of a hollow structure for the fiber-optic cable to pass through; and after the connecting member is sleeved on the tube and positioned in place ready to be engaged with the detachable fastener, the connecting member is slidable relative to the tube and the boot mounted on the tube.

* * * * *